(12) United States Patent
Lisi et al.

(10) Patent No.: US 7,195,836 B2
(45) Date of Patent: Mar. 27, 2007

(54) POLYMERIC SEPARATOR PLATES

(75) Inventors: Daniel J Lisi, Eastpointe, MI (US); Richard H Blunk, Macomb, MI (US); John N Owens, Royal Oak, MI (US); Youssef M Mikhail, Sterling Heights, MI (US); Mahmoud H Abd Elhamid, Grosse Pointe Woods, MI (US)

(73) Assignee: General Motors Corporation, Detroit, MI (US)

( * ) Notice: Subject to any disclaimer, the term of this patent is extended or adjusted under 35 U.S.C. 154(b) by 147 days.

(21) Appl. No.: 10/383,500

(22) Filed: Mar. 7, 2003

(65) Prior Publication Data

US 2004/0175608 A1    Sep. 9, 2004

(51) Int. Cl.
*H01M 2/00* (2006.01)

(52) U.S. Cl. ............... 429/34; 429/38; 429/39

(58) Field of Classification Search ............... 429/34, 429/38; 428/426, 458, 475.2, 480, 688; 252/510, 252/511
See application file for complete search history.

(56) References Cited

U.S. PATENT DOCUMENTS

| | | | |
|---|---|---|---|
| 5,952,118 A * | 9/1999 | Ledjeff et al. | 429/32 |
| 6,099,984 A | 8/2000 | Rock | |
| 6,309,773 B1 | 10/2001 | Rock | |
| 6,358,642 B1 | 3/2002 | Griffith et al. | |
| 6,403,245 B1 * | 6/2002 | Hunt | 429/33 |
| 6,503,653 B2 | 1/2003 | Rock | |
| 2002/0054995 A1 | 5/2002 | Mazurkiewicz | |
| 2003/0027030 A1 * | 2/2003 | Kawashima et al. | 429/34 |
| 2003/0124406 A1 * | 7/2003 | Ohtani et al. | 429/34 |

FOREIGN PATENT DOCUMENTS

| | | | |
|---|---|---|---|
| EP | 1020941 | * | 7/2000 |
| JP | 10-74527 | * | 3/1998 |
| WO | WO 01/80339 | * | 10/2001 |

OTHER PUBLICATIONS

Technical Speccifications for BMC 940 Vinyl Ester Pipolar Plate Material, Mar. 18, 2001.
PCT/US03/27578 International Search Report mailed Oct. 29, 2004.

* cited by examiner

*Primary Examiner*—Raymond Alejandro
(74) *Attorney, Agent, or Firm*—Harness, Dickey & Pierce, P.L.C.

(57) ABSTRACT

A separator plate in an electrochemical cell and method for making the same includes a body with an electrically conductive first section having fluid flow fields with a plurality of flow channels formed therein. A second section is provided adjacent to the first section that has a header area defining a manifold that supplies fluids to the flow fields of each fuel cell. The second section is non-conductive to prevent possible electrical interaction with any aqueous fluids of finite ionic conductivity present in the fuel cell, which may result in inefficient fuel cell operations.

20 Claims, 3 Drawing Sheets

POLYMERIC SEPARATOR PLATES

FIELD OF THE INVENTION

The present invention relates to PEM fuel cells and, more particularly, to polymeric separator plates and methods for making the same.

BACKGROUND OF THE INVENTION

Fuel cells have been proposed as a power source for electric vehicles and other applications. One known fuel cell is the PEM (i.e., Proton Exchange Membrane) fuel cell that includes a so-called "membrane-electrode-assembly" comprising a thin, solid polymer membrane-electrolyte having an anode on one face of the membrane-electrolyte and a cathode on the opposite face of the membrane-electrolyte. The anode and cathode typically comprise finely divided carbon particles, having very finely divided catalytic particles supported on the internal and external surfaces of the carbon particles, and proton conductive material intermingled with the catalytic and carbon particles.

The membrane-electrode-assembly is sandwiched between a pair of electrically conductive contact elements which serve as current collectors for the anode and cathode, and may contain appropriate channels and openings therein for distributing the fuel cell's gaseous reactants (i.e., $H_2$ & $O_2$/air) over the surfaces of the respective anode and cathode.

Bipolar PEM fuel cells comprise a plurality of the membrane-electrode-assemblies stacked together in electrical series while being separated one from the next by an impermeable, electrically conductive contact element known as a bipolar or separator plate or septum. The separator or bipolar plate has two working faces, one confronting the anode of one cell and the other confronting the cathode on the next adjacent cell in the stack, and each bipolar plate electrically conducts current between the adjacent cells. Contact elements at the ends of the stack are referred to as end, terminal, or collector plates. These terminal collectors contact a conductive element sandwiched between the terminal bipolar plate and the terminal collector plate.

The separator or bipolar plates comprise two independent plates having a void between them for coolant flow. Various coolant compositions for fuel cells are known in the art. Aqueous based coolants are a viable and desirable option from a thermal load standpoint; however, these same coolants are easily contaminated with ionic species that support undesirable electrolysis and corrosion reactions at the separator plate surface, creating inefficiency in high voltage fuel cell operation. There remains the challenge to optimize the coolant and separator plates to promote fuel cell efficiency as cost-effectively as possible.

SUMMARY OF THE INVENTION

The present invention provides a separator plate for use in a fuel cell stack. The separator plate comprises a flow field with a plurality of flow channels formed therein. The separator plate further comprises a header adjacent to the flow field, where the header defines a manifold for supplying fluid to the flow channels, and wherein the flow field comprises an electrically conductive material and the header comprises an electrically non-conductive, non-metallic material.

In another aspect, the present invention provides a method for forming a separator plate, comprising forming first and second separator plate sections and joining them into an integral body. The first section comprises electrically conductive material, the second section comprises electrically non-conductive material, and each of the first and second sections comprise polymeric material which is the same or different polymeric material.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

The present invention contemplates a separator plate in an electrochemical fuel cell stack that has a body with an electrically conductive first section having fluid flow fields with a plurality of flow channels formed therein and a second section adjacent to the first section that has a header area defining a manifold for supplying fluids to each individual fuel cell, and more particularly, to the respective flow fields of each fuel cell. The second section is non-conductive to prevent possible electrical interaction with any aqueous fluids (of finite ionic conductivity) present in the fuel cell, which may result in inefficient fuel cell operations. Further, the present invention contemplates methods to form such a separator plate. First, to better understand the present invention, a description of an exemplary fuel cell and stack are provided herein.

Figure 1:
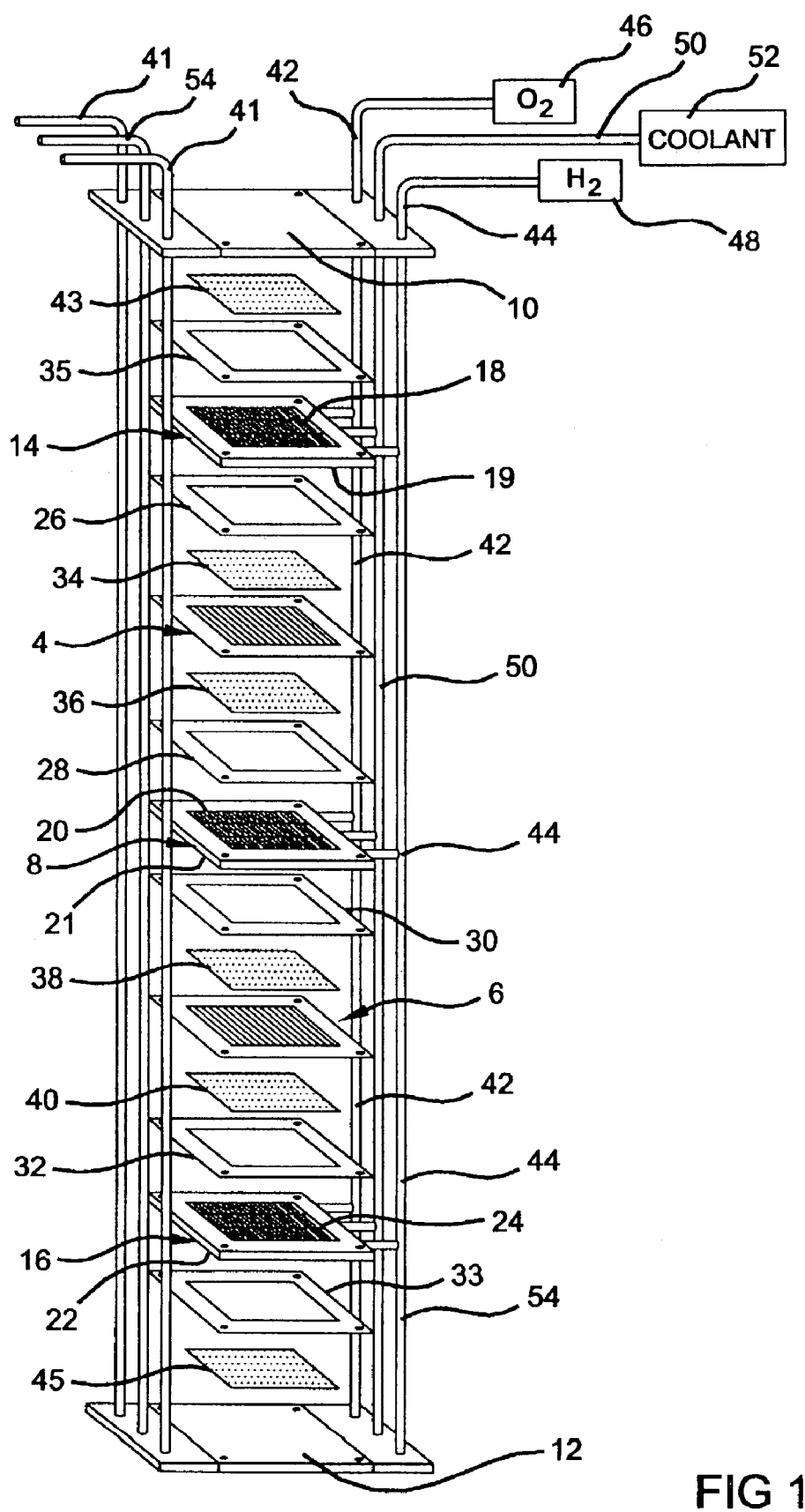
FIG. 1 is a schematic illustration of two cells in a liquid-cooled PEM fuel cell stack.

FIG. 1 depicts two individual proton exchange membrane (PEM) fuel cells connected to form a stack having a pair of membrane-electrode-assemblies (MEAs) 4 and 6 separated from each other by an electrically conductive, liquid-cooled, bipolar separator plate 8. An individual fuel cell, which is not connected in series within a stack, has a separator plate 8 with a single electrically active side. In a stack, a preferred bipolar separator plate 8 typically has two electrically active sides 20, 21 within the stack, each active side 20, 21 respectively facing a separate MEA 4, 6 with opposite charges that are separated, hence the so-called "bipolar" plate. As described herein, the fuel cell stack is described as having conductive bipolar plates, however the present invention is equally applicable to separator plates having only a single fuel cell.

The MEAs 4, 6 and bipolar plate 8, are stacked together between end stainless steel clamping terminal plates 10 and 12, and separator plates 14 and 16. The end separator plates 14, 16, as well as both working faces of the bipolar plate 8, contain a plurality of lands adjacent to grooves or channels on the electrically active sides 18, 19, 20, 21, 22, and 24 for distributing fuel and oxidant gases (i.e., $H_2$ & $O_2$) to the MEAs 4, 6. Nonconductive gaskets or seals 26, 28, 30, 32, 33, and 35 provide seals and electrical insulation between the several components of the fuel cell stack. Gas-permeable conductive diffusion media 34, 36, 38, and 40 press up against the electrode faces of the MEAs 4, 6. Additional layers of conductive media 43, 45 are placed between the end separator plates 14, 16 and the terminal collector plates 10, 12 to provide a conductive pathway therebetween when the stack is compressed during normal operating conditions. The end separator plates 14, 16 press up against the diffusion media 34, 40 respectively, while the bipolar separator plate 8 presses up against the diffusion media 36 on the anode face of the MEA 4, and against diffusion media 38 on the cathode face of MEA 6.

Oxygen is supplied to the cathode side of the fuel cell stack from storage tank 46 via appropriate supply plumbing 42, while hydrogen is supplied to the anode side of the fuel cell from storage tank 48, via appropriate supply plumbing 44. Alternatively, air may be supplied to the cathode side from the ambient, and hydrogen to the anode from a methanol or gasoline reformer, or the like. Exhaust plumbing 41 for both the anode and cathode sides of the MEAs are also provided. Additional plumbing 50 is provided for circulating coolant from a storage area 52 through the bipolar separator plate 8 and end separator plates 14, 16 and out the exit plumbing 54. Hereinafter, the term "separator plate" refers to either a bipolar plate or an end contact separator plate. A separator plate may also be generally referred to as defining the entire assembly of two independent separator plates (with a space in between them respectively for coolant flow) or the single independent separator plate itself.

Selection of the material of construction for the separator plates includes weighing such parameters as overall density (mass and volume); durability, flexibility, strength, and toughness for handling; electrical resistance; and corrosion and oxidation resistance within the fuel cell environment. Thus, some of the important considerations for a separator plate material include performance as an electrical current conductor in electrically active regions, while having the ability to withstand any corrosive conditions in the non-conductive distribution/header regions.

Many separator plates are made of an entirely conductive body, including both the header and the electrically active areas. Exposure of separator plate in the header region (where it is electrically charged and conductive) to the fluids entering and exiting the fuel cell can promote dissolution of the separator plate body, especially in the harsh conditions occurring on the "wet side" (i.e. the side facing a cathode of an internal fuel cell) of the stack. Also, it is desirable to use aqueous based coolants in fuel cells due to their low viscosity and high heat capacity, providing efficient cooling (low pumping power requirements and more uniform separator plate temperatures) of the fuel cells in the stack. However, one significant consequence of using an entirely conductive separator plate, is the possible interaction of an electrically conductive separator plate with an ionically conductive aqueous coolant. The ionic species in an aqueous based coolant, which result from coolant contamination from fuel cell stack and coolant loop materials (e.g., gaskets, separator plate, radiator, pumps, etc.), support charge transfer reactions, or "shunt currents", in a high voltage fuel cell stack. More specifically, if the ionically conductive coolant contacts the electrically conductive separator plate at high stack potentials, electrolysis of the water base coolant ($H_2$ and $O_2$ evolution) and dissolution/oxidation of the separator plate can occur. The cations in the coolant and the electrons in the separator plate support these undesirable shunt currents. These currents are detrimental for multiple reasons, including a need to deionize the coolant loop somewhere in the system, a necessity to vent hydrogen and oxygen gas in the coolant loop, dissolving/oxidation effects on the separator plate body, and lower fuel efficiency and unnecessary energy losses by consumption of electrons in the coolant loop.

The present invention contemplates electrically isolating the regions of the separator plate that are exposed to ionically-conducting aqueous based coolant, by forming these regions from a non-conductive, non-metallic material. Further, all conductive areas are formed of an electrically conductive material to permit electrical current to pass through the fuel cell stack for proper operation.

Figure 2:
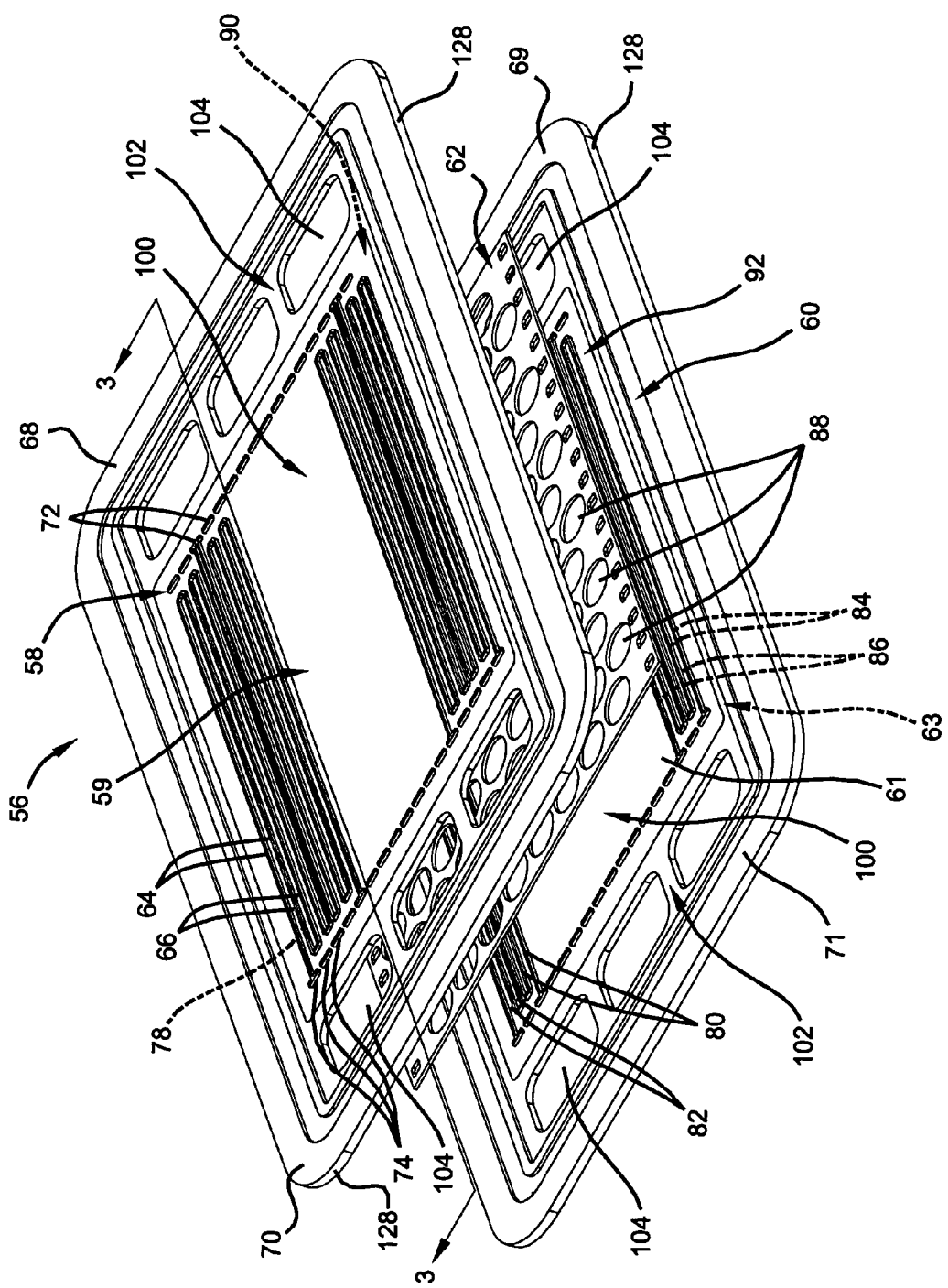
FIG. 2 is an exemplary separator plate showing a preferred embodiment of the present invention.

FIG. 2 is an isometric, exploded view of a bipolar separator plate 56 comprising a first exterior sheet 58, a second exterior sheet 60, and an interior spacer sheet 62 interadjacent the first exterior sheet 58 and the second exterior sheet 60. The exterior sheet 58 has a first working face 59 on the outside thereof which confronts a membrane-electrode-assembly (not shown) and is formed so as to provide a plurality of flow channels comprising lands 64 which define therebetween a plurality of grooves 66 known as a "flow field" through which the fuel cell's reactant gases (i.e., $H_2$ or $O_2$) flow in a tortuous path from an inlet side 68 of the bipolar plate 56 to an outlet side 70 thereof. When the fuel cell is fully assembled, the lands 64 press against the diffusion media 36, 38 (FIG. 1) which, in turn, press against the MEAs 4 and 6 respectively. For drafting simplicity, FIG. 2 depicts only two arrays of lands and grooves 64,66. In reality, the lands and grooves 64,66 will cover the entire external faces 59,63 of sheets 58, 60 that engage the diffusion media 36, 38. The reactant gas is supplied to grooves 66 from a header region 102. Header 102 comprises a manifold groove 72 arranged so that fluid is transported to a respective one of such manifold grooves 72 that lie along one side 68 of the fuel cell, and exits the grooves 66 via another manifold groove 74 that lies adjacent the opposite side 70 of the fuel cell.

The second exterior sheet 60 is similar to the first exterior sheet 58. The internal face 61 (i.e., coolant side) of sheet 60 is shown in FIG. 2. In this regard, there is depicted a plurality of ridges 80 defining therebetween a plurality of channels 82 through which coolant flows from one side 69 of the bipolar plate 56 to the other 71. Like sheet 58, the external side of the sheet 60 has a working face 63 having a plurality of lands 84 thereon defining a plurality of grooves 86 through which the reactant gases pass on the working face side 63 in the same manner as working face side 59 of exterior sheet 58. The interior metal spacer sheet 62 is positioned interjacent the exterior sheets 58 and 60 and includes a plurality of apertures 88 therein to permit coolant to flow between the channels 82 in sheet 60 and the channels 78 in the sheet 58 thereby breaking laminar boundary layers and affording turbulence which enhances heat exchange with the inside faces 90 and 92 of the exterior sheets 58 and 60 respectively. As appreciated by one of skill in the art, a similar configuration can be used in a single fuel cell separator plate 56, which is bounded internally by the MEA and externally by the terminal end plates, where a coolant field may be used along the active face. Further, for purposes of the present invention, a separator plate 56 may constitute only half of the depicted separator plate configuration, for example, a separator plate may refer to either sheet 58 or 60, and may later be assembled to form a pair of separator plates 56 as shown in FIG. 2.

The single separator plate or sheet 58 has an electrically conductive first region known as the flow field 100, as well as the electrically non-conductive second region (or header region previously discussed) 102. Apertures 104 within the non-conductive header region 102 extend through the body 128 of the separator sheets 58,60 to permit fluid transport both into and out of the fuel cell during operating conditions, as well as between the several fuel cells of the stack. Various fluids entering the stack include a hydrogen-containing gas, an oxygen-containing gas, and a liquid coolant (e.g. an aqueous coolant mixture of ethylene glycol and water). Reactant gases are distributed to each fuel cell along both sides or faces 59,63 of the separator sheets 58,60 to the MEA and coolant is distributed along the second internal faces 90,92 of sheets 58,60. The particular quantity or sequence of the apertures 104 and fluid distribution flow fields shown in FIG. 2 is not limiting, and is merely exemplary as described herein, as numerous configurations are possible as recognized by one of skill in the art. A separator plate 56 flow field 100 design may have varied inlet and outlet apertures and flow field configurations, as well as fluid delivery placement.

Figure 3:
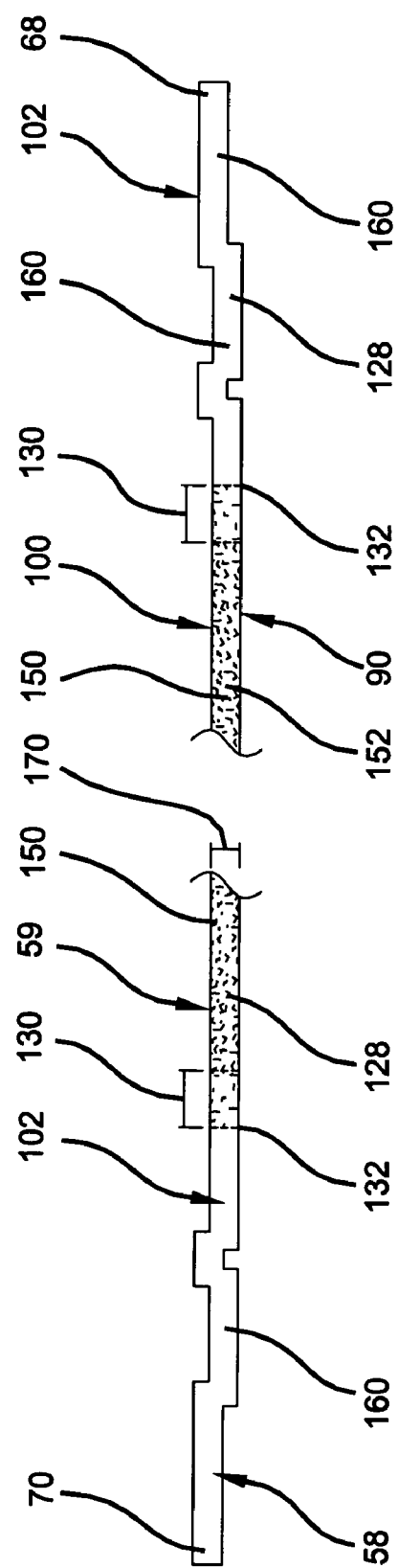
FIG. 3 is a cross-sectional view taken along line 3—3 of FIG. 2, showing a separator plate of a preferred embodiment of the present invention.

FIG. 3 shows a cross sectional view along line 3—3 of FIG. 2. The single separator plate or sheet 58 is divided into the electrically conductive flow field region 100 and the non-electrically conductive header regions 102. The boundary between the flow field region 100 and header regions 102 may have a transition zone 130 where conductive material is mixed with non-conductive material and is gradually phased out to a negligible concentration of conductive material in the header region 102. In an alternate embodiment, there is a distinct boundary line 132 which divides conductive material from non-conductive material, eliminating a gradual reduction of concentration of conductive materials in the transition zone 130.

In a preferred embodiment of the present invention, both the flow field region 100 and the header region 102 comprise a polymeric material. Preferably conductivity is imparted in the flow field region 100 by conductive materials distributed throughout the polymer in the flow field region 100. Thus, the polymeric material used in the flow field and header regions 100,102 may be different polymers, or the same polymeric material. Preferred polymers in accordance with the present invention include both thermoplastic and thermoset polymers including: epoxies, silicones, polyamide-imides, polyether-imides, polyphenols, fluoro-elastomers (e.g., polyvinylidene fluoride), polyesters, phenoxy-phenolics, epoxide-phenolics, acrylics, urethanes, epoxy vinyl ester, vinyl ester, polyamides, polyimides, and mixtures and equivalents thereof. Particularly preferred polymers include polypropylene, polyamides, polyimides, epoxy vinyl ester resin, vinyl ester resin, epoxy, and mixtures thereof. Such a polymer comprises any polymer that is water-insoluble when cross-linked or cured or solidified and can withstand the hostile oxidative and acidic environment of the fuel cell.

In one embodiment of the present invention, conductive filler materials 150 are dispersed throughout the flow field region 100 to enable electrical conductivity through the flow field region 100 of the body 128 of the separator sheet 58. Conductive filler materials 150 are dispersed in a first polymer 152 of the flow field region 100, and form a conductive composite matrix. Such conductive filler materials 150 may comprise particles, fibers, woven materials, cloth, and the like. Preferred conductive filler materials 150 are selected from the group consisting of: gold, platinum, graphite, carbon, nickel, conductive metal borides, nitrides and carbides (e.g., titanium nitride, titanium carbide, titanium diboride), titanium alloys containing chromium and/or nickel, palladium, niobium, rhodium, rare earth metals, and other noble metals. Most preferably, the conductive filler materials 150 will comprise carbon, graphite (i.e., hexagonally crystallized carbon), expanded graphite (i.e. graphite flakes which have been greatly expanded so as to generally have a final thickness or "c" direction dimension which is as much as about 80 or more times the original "c" direction dimension), or conductive carbon cloth, paper, or mat. The conductive filler materials 150 comprise varying volumetric ranges of the polymer 152 and conductive material matrix, ranging from about 10 to 80% of conductive particles per total volume. Proper functioning of the conductive filler material 150 in the flow field region 100 generally requires a conductive path established for example, through a plane 170 of the body 128, defined by the first surface 59 extending through to the inner surface 90 of sheet 58. Thus, conductive filler materials 150 preferably extend substantially through the plane of the body 128 to establish preferred conductivity levels. The ranges of conductive filler materials 150 added to the first polymer 152 are determined by the density, conductivity, and other physical effects of the particles 150 on the matrix in the flow field region 100 (i.e. particles having a high conductivity and low density can be used in lower weight percentages). Polymers with expanded graphite as the conductive filler materials 150 will typically contain about 10% by volume expanded graphite particles.

In one of many preferred embodiment, the header region 102 is adjacent to the flow field region 100. In one preferred embodiment, a pair of header regions 102 bracket, or flank, the flow field region 100 on either side 68, 70. Such a pair of header regions 102 may be configured to permit ingress of fluids at the first side 68, and egress of fluids at the second side 70. Further, in other preferred embodiments, the flow field region 100 may be centrally located, and the header region 102 may be outboard (i.e. located externally in relation to) the flow field region 100. In another preferred alternate embodiment, the flow field region 100 is entirely circumscribed by the header region 102, where the header region 102 extends around the periphery of the sheet or plate 58.

A second polymer 160 of the header region 102 is preferably selected from the polymers described above, and is non-conductive and non-metallic. In one preferred embodiment of the present invention, the header region 102 material is reinforced with non-conductive reinforcing materials (not shown) to form a composite matrix for additional flexibility and strength. Placement of non-conductive reinforcing materials within the header region 102 has been demonstrated to improve toughness, ductility, and stiffness of the separator sheet 58. Such mechanical property enhancement (improved flexural data) reduces inadvertent destruction (i.e. scrap rate) of the separator plate 58 during processing and assembly in the fuel cell. The non-conductive reinforcing materials may be particles, fibers, woven or non-woven cloth, mats, flock, or the like. Preferred non-conductive reinforcing materials include: polyesters, polypropylenes, acrylics, glass, cotton, and mixtures and equivalents thereof. A most preferred non-conductive reinforcing material is quartz. Non-conductive reinforcing materials may be added to the second polymer 160 in ranges from 0 to 80% by volume of the total matrix. Thus, such reinforcing material is optionally included in an amount of up to 80% by volume.

Methods of forming a separator plate according to the present invention include forming (i.e. casting) a first and a second separator plate section. The first section of the plate corresponds to the first electrically conductive flow field region of the separator plate and is formed of a conductive material. The second section of the plate corresponds to the second electrically non-conductive header region of the separator plate. The first and second sections are joined together to form a single separator plate having an integral body.

In certain preferred embodiments of the present invention, the forming step and the joining step of the first and second sections coincide with one another and occur essentially simultaneously, and processing generally entails only one step. When forming a separator plate according to the present embodiment, it is generally preferred that the first and second sections comprise the same polymer or mixture of polymers. Thus, the first and second sections may be formed simultaneously as one piece to form the integral body, if formed from an injection molding process. A conductive filler material is placed into an injection mold in an area where the first section will be formed. The area of the mold where the second section will be formed is left devoid of conductive material. However, in an alternate embodiment, a non-conductive reinforcing filler can be placed in the area where the second section will be formed. A preferred conductive filler material is a conductive carbon fiber mat, cloth, or paper, such as for example, the commercially available Toray® graphite-fiber paper made by Toray Carbon Fibers America, Inc. A preferred non-conductive reinforcing material for use with this method might include: fiber, mat, cloth, paper, or flock, such as for example, a glass mat or cotton flock. The polymer is injected into the injection mold form under temperature and pressure, where it fills in the mold in both the flow field region and header region to result in the single separator plate. Thus, the flow field region is conductive and the header region is non-conductive.

Another embodiment of the method of the present invention includes sheet molding or extruding a single sheet of polymeric material. Conductive filler material can be combined with polymer in the sheet by sprinkling conductive filler materials over the sheet in the first section as it is being formed. Such combining of conductive filler and polymer materials is most suitable to the forming process of sheet molding, however, may be adapted to extrusion or other suitable processing methods. Such conductive filler material is selected to have dimension relative to plate thickness so that the conductive filler material is disposed in a through plane orientation from one plate surface 59 to the other 90, as in section 170 of FIG. 3. Preferably the second non-conductive header region is masked for the sprinkling portion of the forming process. Further, non-conductive filler materials may be dispersed throughout the polymer of the second region in much the same manner, by sprinkling materials where the first region is protected by masking. Thus, in this embodiment the joining and forming steps are combined.

Other embodiments of the method of the present invention include preforming either one or both of the first flow field and second header regions prior to joining them together, wherein the first and second region polymers need not be of the same composition. In one aspect, the first section is preformed by any conventional method, such as sheet molding, extrusion, compression molding, or the like. The conductive filler materials are included in the mixture prior to forming into a first section. In one particularly preferred method, known as "overmolding" the preformed first section is placed within an injection mold with voids surrounding and/or adjacent to the first section for forming the second section. Then, a non-conductive polymer resin is injected into the mold and fills the voids, providing a single separator sheet having an integral body when the materials are removed from the injection mold.

An alternate embodiment, includes separately forming each of the first section and second section, in accordance with the principles discussed above. In addition to reinforcing material (conductive and optionally non-conductive) a "two-stage" curing agent or catalyst is added to both the first and second sections. Such two-stage curing agents are well known in the art, and are added to each of the first section and the second section polymer compositions during their independent forming steps. Thus, the first and second section pieces can be cured to a "Stage A" level (i.e. partially cured) by applying heat at relatively low temperatures, to lend strength to the independent first and second section pieces for handling. Such curing temperatures are typically between about 70° to 110° C. The first and second sections can subsequently be joined together after their independent formation. The sections are placed in the appropriate position, as they will be integrated into the body of the single separator plate. Low heat (i.e. 60–90° C.) can optionally be applied to facilitate merging of the first section with the second section. After placement of the first and second section pieces, heat and optionally pressure are applied to cure the polymers in both the first and second sections to a "Stage B" level (i.e. fully cured). Preferred temperature ranges for the second Stage B level cure are from about from about 100° C. to about 250° C. It is further contemplated that in an alternate embodiment, only one of the first and second sections has a two-stage curing agent added to the polymer, wherein one of the sections has been previously cured or solidified. The amount of curing agent in one section is enough to effectuate a strong interface between the two sections to form an integral body of the separator plate. The integrity of the interface between the two separately formed sections is dependent on chemical interaction between the materials, and polymer and curing agent systems. An alternate embodiment may include a polymerization reaction without a curing agent, where the rate of the polymerization reaction is temperature dependent and can be used to control the reaction. The first and/or second sections may be heated for partial polymerization or curing, then cooled, and later reheated when first and second sections are joined and solidified to a final state. As appreciated by one of skill in the art, many different methods of forming and joining a separator plate are feasible with the present invention. The methods described herein are preferred embodiments of methods of forming the separator plate, and are not exclusive methods of making the present invention.

The fluid distribution or flows channels are preferably patterned, or formed, in the first section, and the fluid distribution headers are likewise patterned in the second section. Fluid distribution channels and headers may be patterned in the separator plate during the forming and joining processes, or alternately after the separator plate is formed. If the first and second sections are made by a process involving molds, the molds may impart the shape of channels and headers during the forming and joining. If the first and second sections are formed and joined together to form the separator plate without channels and headers, they may be formed into the separator plate by subsequent processing steps. Preferred methods of patterning the channels and headers after forming the separator plate include stamping, with optional application of low heat to soften the polymer material.

The present invention thus provides the ability to use both a separator plate in a fuel cell and a thermally efficient aqueous base cooling medium, while eliminating concerns over shunt current generation, $H_2$ and $O_2$ evolution, or unnecessary attack of the separator plate itself. Further, the separator plates of the present invention have desirable physical properties, including durability, strength, low weight, and economical material costs.

More specifically, the non-conductive headers eliminate or at least reduce the occurrence of shunt currents hydrogen and oxygen evolution, and separator plate dissolution/oxidation. Such non-conductive headers provide improved mechanical properties associated with not having conductive particles in the headers. It has been determined that, for composite plates having conductive, graphite particles in the headers, such plates break 90% of the time. Such breakage occurs in the brittle conductive header areas because the header areas contain holes for gas and coolant manifolds, and have relatively narrow cross-section. When plates are handled such as during molding, bonding, shipping, and stacking, the plates almost always break in these weak header areas.

By way of testing, flexural data, extension at break and stiffness, was obtained to compare a highly graphite-filled material, a low graphite-filled material with up to 25% graphite, and a material without graphite and having a glass fabric reinforcement. In general, extension at break (ductility, toughness) increased as the graphite concentration decreased, which is a desired attribute to reduce plate breakage. Although stiffness may be lessened as the graphite concentration decreases, it appears that toughness/ductility is a more important mechanical attribute than stiffness. In view of this, the combination of glass reinforcement in the non-conductive header, along with conductive graphite filler material in the conductive area, results in the advantages of acceptable toughness and stiffness for overall serviceability of the plate.

While the invention has been described in the terms of specific embodiments thereof, it is not intended to be limited thereto but rather only to the extent set forth hereafter in the claims which follow. The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A separator plate for use in a fuel cell stack, said separator plate comprising:
   a flow field, a majority of which is electrically conductive;
   a header adjacent said flow field, said header being electrically non-conductive; and
   a transition zone defined between a first interface abutting said flow field and a second interface abutting said header such that said flow field is in a spaced relation to said header, said transition zone having an electrical conductivity less than said electrical conductivity of said flow field, said transition zone including a conductive material mixed with a non-conductive material, said conductive material gradually phased out to a negligible amount proximate said second interface.

2. The separator plate according to claim 1, wherein said flow field, header and transition zone form an integral body of said separator plate.

3. The separator plate according to claim 1, wherein said flow field and said header are each comprised of a polymeric material.

4. The separator plate according to claim 3, wherein said polymeric material is selected from the group consisting of: epoxy vinyl ester, vinyl ester, epoxy, polyamides, polyamides, polyamide-imides, polypropylene, and mixtures thereof.

5. The separator plate according to claim 3, wherein said polymeric material of said flow field and said polymeric material of said header are the same.

6. The separator plate according to claim 3, wherein said polymeric material of said flow field and said polymeric material of said header are different.

7. The separator plate according to claim 3, wherein said flow field is comprised of said polymeric material and an electrically conductive filler material.

8. The separator plate according to claim 7, wherein said electrically conductive filler material is selected from the group consisting of: expanded graphite, gold, platinum, nickel, palladium, rhodium, niobium, titanium, chromium, rare earth metals, graphite, carbon, compounds and alloys thereof, and mixtures thereof.

9. The separator plate according to claim 3, wherein said header is comprised of a non-metallic polymeric material and a non-conductive, non-metallic filler material.

10. The separator plate according to claim 9, wherein said non conductive, non-metallic filler material is selected from the group consisting of: polyester, polypropylene, acrylics, quartz, glass, cotton flock, and mixtures thereof.

11. The separator plate according to claim 1, wherein said header is outboard of said flow field.

12. The separator plate according to claim 11, wherein said flow field is centrally located and a pair of said headers bracket said flow field.

13. The separator plate according to claim 11, wherein said flow field is centrally located and said header circumscribes said centrally located flow field.

14. A separator plate for use in a fuel cell stack, said separator plate comprising:
    a flow field, a majority of which is electrically conductive, said flow field comprised of a first polymeric material and conductive filler particles;
    a header adjacent said flow field, said header being electrically non-conductive, said header comprised of a second polymeric material and a non-conductive reinforcement filler, wherein a manifold is patterned therein for distributing fluid to said flow field; and
    a transition zone defined between a first interface abutting said flow field and a second interface abutting said header such that said flow field is in a spaced relation to said header, said transition zone having an electrical conductivity less than said electrical conductivity of said flow field, said transition zone including a conductive material mixed with a non-conductive material, said conductive material gradually phased out to a negligible amount proximate said second interface.

15. A separator plate according to claim 14, wherein said transition zone includes said conductive filler particles and said non-conductive reinforcement filler.

16. The separator plate according to claim 14, wherein said flow field, header and transition zone form an integral body of said separator plate.

17. The separator plate according to claim 14, wherein said first polymeric material and said second polymeric material are the same.

18. The separator plate according to claim 14, wherein said first polymeric material and said second polymeric material comprise different polymers.

19. The separator plate according to claim 14, wherein said second polymeric material of said header is selected from the group consisting of: polyester, polypropylene, acrylics, quartz, glass, cotton flock, and mixtures thereof.

20. The separator plate according to claim 15, wherein said non-conductive reinforcement filler of said header is selected from the group consisting of particles, fibers, woven cloth, non-woven mat, and flock.

* * * * *